Feb. 20, 1962   J. GILLOIS ETAL   3,021,544
SELF PROPELLING SECTIONAL FLOATING BRIDGE
Filed May 29, 1956   6 Sheets-Sheet 1
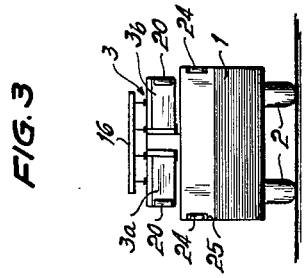
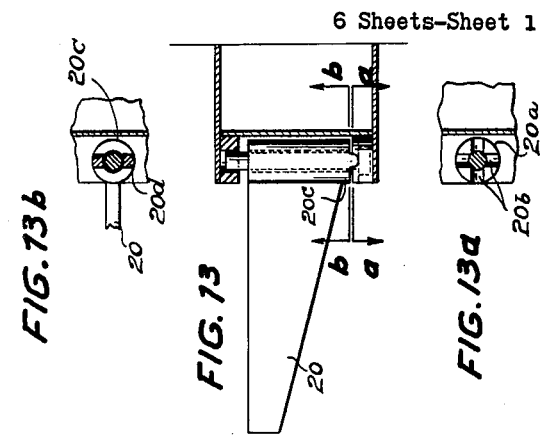
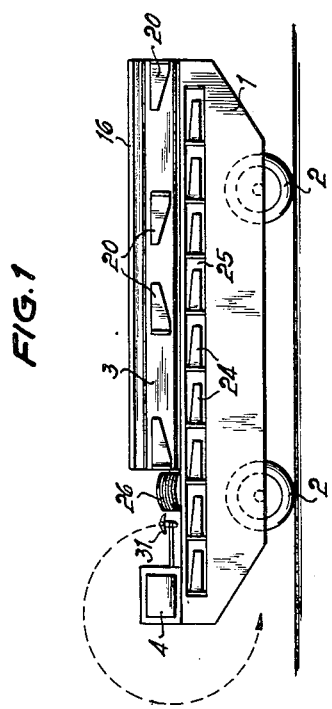
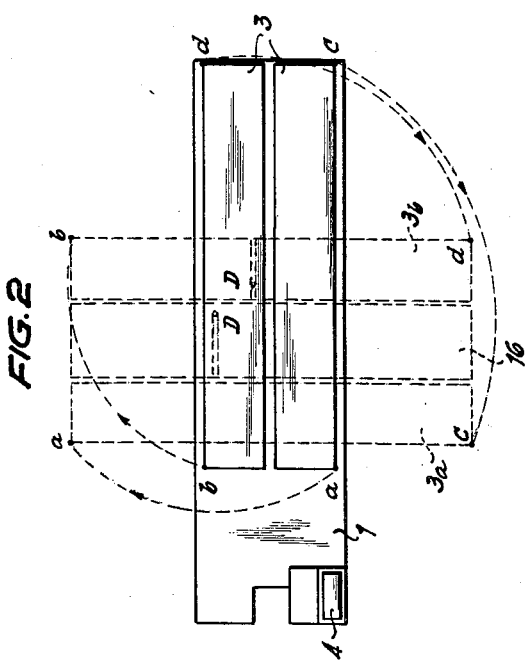
INVENTORS
Hermann Walter Gehlen
Jean Gillois
BY
AGENT INVENTORS
Hermann Walter Gehlen
Jean Gillois
BY
AGENT

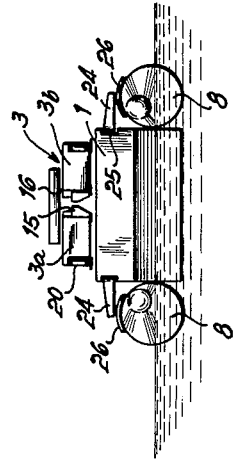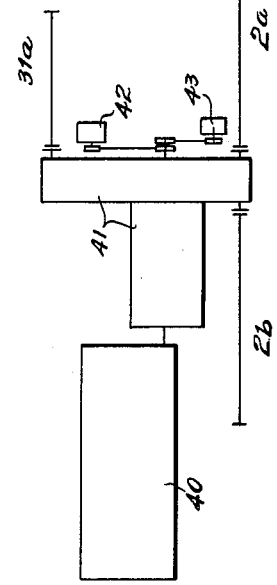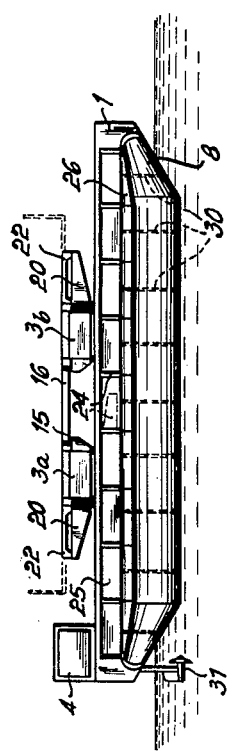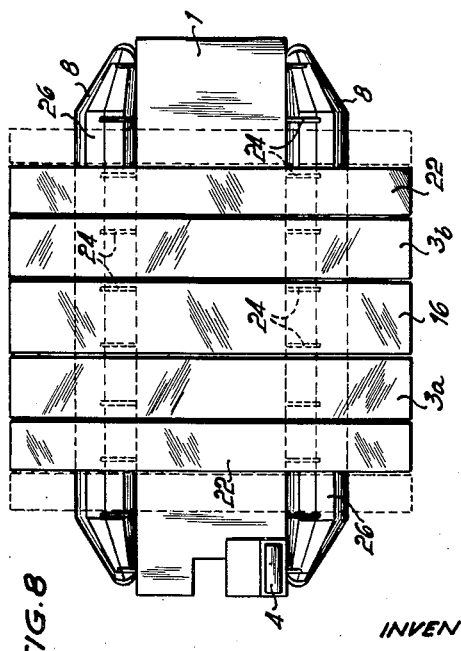

Feb. 20, 1962  J. GILLOIS ETAL  3,021,544
SELF PROPELLING SECTIONAL FLOATING BRIDGE
Filed May 29, 1956  6 Sheets-Sheet 4

INVENTOR.
Hermann Walter Gehlen
BY Jean Gillois

Robert H. Jacob
AGENT

Feb. 20, 1962    J. GILLOIS ETAL    3,021,544
SELF PROPELLING SECTIONAL FLOATING BRIDGE
Filed May 29, 1956    6 Sheets-Sheet 5

INVENTORS
Hermann Walter Gehlen
Jean Gillois

BY Robert H. Jacob
AGENT

Feb. 20, 1962   J. GILLOIS ETAL   3,021,544
SELF PROPELLING SECTIONAL FLOATING BRIDGE
Filed May 29, 1956   6 Sheets-Sheet 6

INVENTORS
Hermann Walter Gehlen
Jean Gillois
BY Robert H. Jacob
AGENT

United States Patent Office 3,021,544
Patented Feb. 20, 1962

3,021,544
SELF PROPELLING SECTIONAL FLOATING
BRIDGE
Jean Gillois, Rastatt, Germany, and Hermann Walter
Gehlen, Pirmasenser Strasse 60, Kaiserslautern, Germany, assignors, by mesne assignments, to Hermann
Walter Gehlen, Kaiserslautern, Pfalz, Germany
Filed May 29, 1956, Ser. No. 588,029
14 Claims. (Cl. 14—27)

The invention relates to sectional floating bridges of the type comprising aligned structural components resting on floating bodies and which are arranged to accommodate provisional traffic and which can be rapidly installed and dismantled.

Heretofore provisional bridges have been built across waterways such as rivers, especially where great widths must be bridged in a manner that the components of the bridge sturcture are rigidly mounted upon anchored floating bodies which are then aligned with one another whereupon an attempt is made to achieve by suitable measures a continuous arrangement of these components, as for example, by rigid connection of the top and bottom girder portions. The assembling of such bridges with a continuous disposition or continuous connection requires trained personnel and cumbersome work for constructing the bridge from the transported individual components and to secure it upon the floating bodies.

The invention overcomes the foregoing shortcomings by mounting upon each floating body of a sectional floating bridge of the type having a girder section in the form of a bridge element comprising two girders, each defining an upper and a lower girder portion and which constitutes a complete sectional portion of the bridge. The bridge elements of several floating bodies are connected by articulated joints at proximate ends of the bottom girder portions and are supported against one another at proximate ends of the upper girder portions by way of abutment plates.

It is also possible to employ several connected floating bodies as a ferry, in which event not only the bottom girder portions but also the top girder portions are connected by suitable firm joints as, for example, by hooks.

In accordance with the invention the establishment of provisional bridges across waterways of any desired width is considerably facilitated. In contrast to the methods in accordance with the prior art where the individual components required for the building of the bridges had to be transported on land vehicles, the components had to be unloaded, after which the land vehicles were of no further use in the construction, the invention employs vehicles which serve at the same time as floating bodies and which are ready for installation at any time and in other locations or on other waters. A further advantage is obtained in that traffic jams due to vehicles and unloaded material are avoided at the location of bridge construction. The use of bridge construction components which are articulatedly connected along one girder portion and which are supported against one another by means of abutment plates at the other girder portion, makes possible the extremely rapid installation of a floating bridge with a small crew of personnel.

Further features of the invention and details of the advantages gained will become more apparent if reference is had to the following description of the different embodiments of the new floating bridge illustrated in the accompanying drawings in which:

FIG. 1 shows a side view of a floating body provided with running wheels and a bridge element placed thereon in the direction of the longitudinal axis;

FIG. 2 is a plan view of the embodiment in accordance with FIG. 1;

FIG. 3 is a front view thereof;

FIG. 7 is a side view of the floating body without wheels in floating condition and with a bridge element which is symmetrically divided along the longitudinal axis;

FIG. 8 shows the floating body in accordance with FIG. 7 with the bridge elements spread out;

FIG. 9 is a head on view of a floating body in accordance with FIG. 7 with additional lateral floats and with folded brackets and with the bridge element extending longitudinally of the bridge element;

FIGS. 13, 13a and 13b illustrate the manner in which the lateral supporting brackets are pivotally mounted.

FIG. 14 is a schematic diagram illustrating the power plant, transmission and driving means.

Figure 4:
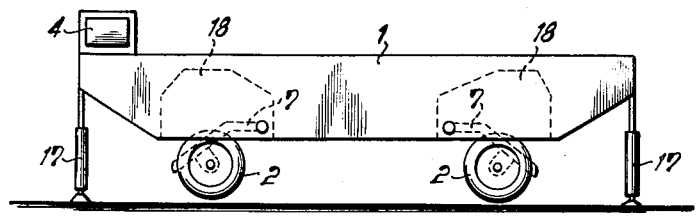
FIG. 4 is a side view of the floating body equipped with retractable wheels and with the bridge element omitted and in the position determined by raising jacks.

The floating body 1 provided with running wheels 2 is shown in side plan and front elevational views in FIGS. 1 to 3 with a bridge element 3 mounted in place. This element is defined by two elongated box shaped members 3a and 3b which constitute the girders of the bridge. The girders 3a and 3b are supported on the floating body 1 by means of pivot members 33 and 32, respectively, and are disposed for movement around these pivots into positions transversely of the floating body. Supporting brackets 20 are provided for laterally mounting a cat walk having a railing or a track enlargement, which brackets are swung inwardly against the longitudinal box girders 3a and 3b of the bridge element 3 while being in transit and are swung outwardly to a position perpendicular with respect to the girders when the bridge is in condition of operation. Track plates 22 may be laid on the outwardly swung brackets (FIGS. 7 and 8). The brackets 20, 24 are rendered self-locking by the simple expedient of providing the lower bearings 20a with semi-circular grooves of semi-circular cross-section 20b in transverse alignment and the brackets with raised ribs 20d correspondingly formed in the lower pivoting part 20c.

Figure 10:
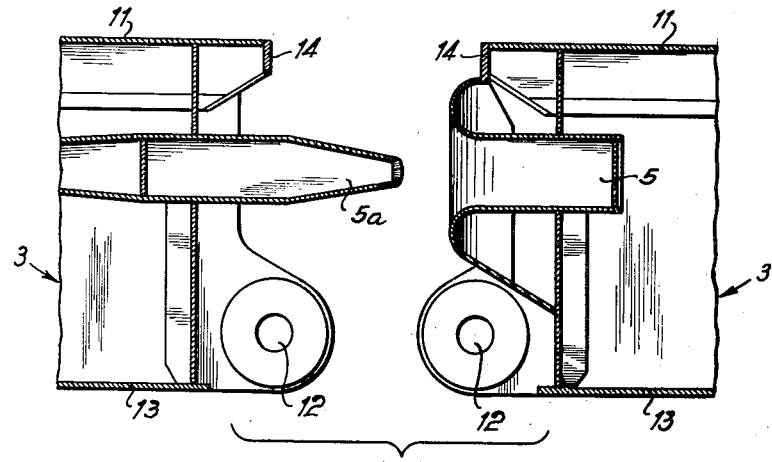
FIG. 10 shows a sectional view of the ends of two bridge elements taken through the interengaging pocket and nose without connecting hooks.

At the front end of the floating body and laterally thereof a control and service station 4 is disposed for the street and water transport. Centrally of the forward ends of the bridge elements 3 which comprise girders 3a and 3b a receiving pocket 5 (see FIG. 10) is located in each of girders 3a and 3b into which enters a nose 5a as the floating bodies are placed in a row. One such nose is located at the end of each of the two girders of the bridge element which is to be connected. The interengaging of these noses with the receiving pockets provides for temporary interlocking of the two bridge elements which are to be concatenated.

Figure 11:
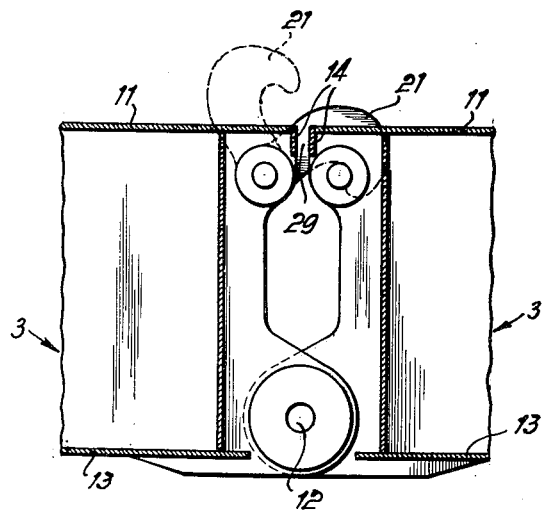
FIG. 11 is a longitudinal section of the ends of the two bridge elements shown in FIG. 10 with secure connection of the upper girder portions by means of hooks.

In order to insure the interchangeability of the bridge elements 3 the noses and the pockets are arranged in such a manner that one bridge element has pockets 5 while the adjacent bridge element has noses 5a at that end. The opposite end of one bridge element thus would have noses and the other element at the other end receiving pockets. This arrangement provides for optional interchangeability of the floating units with the bridge elements 3a and 3b mounted thereon. If two or more floating bodies or units are combined to constitute a ferry, not only the bottom girder portions 13, but also the top girder portions 11 of the bridge elements 3a and 3b may be rigidly connected, as for example, by means of hooks 21 (FIG. 11). It should be noted that both bridge elements 3a and 3b of each floating body are provided with a pocket 5 at one end and a nose 5a at the other end.

Preferably the floating body is made of metal. Suitably each body is provided with its own means of propulsion for transportation on land and on the water, as well as with steering means. The propulsion means 31 (FIG. 7) for transport in the water is laid over onto the deck (FIG. 1) of the floating body or unit during transportation on land.

Figure 5:
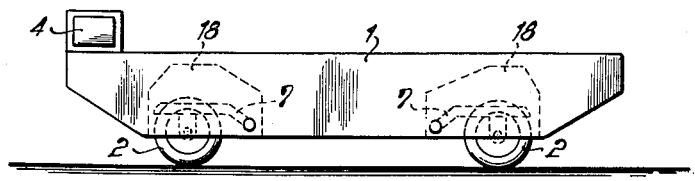
FIG. 5 shows the floating body in rolling condition.
Figure 6:
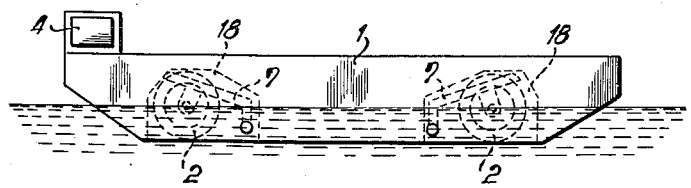
FIG. 6 shows the same body in floating condition with retracted wheels.

FIGS. 4–6 illustrate the different operating conditions of a floating unit. The floating body 1 proper is illustrated in a lateral view with the bridge element omitted. The wheels 2 may be raised or lowered by hydraulically, mechanically or electrically activated gear 7. In the condition illustrated in FIG. 4 the floating body is supported at both ends by jacks 17 in order to relieve the load on the wheels, and the wheels do not touch the ground. FIG. 5 illustrates the floating body in driving condition for transportation on land. FIG. 6 illustrates the floating position of the floating body. The wheels are retracted by means of gear 7 into housings 18 which are open at the bottom, but are otherwise waterproof. A bridge unit which is of maximum permissible width for transportation of floating units on roads will not always be sufficient to meet the requirements as to track width of the floating bridge.

Figure 7A:
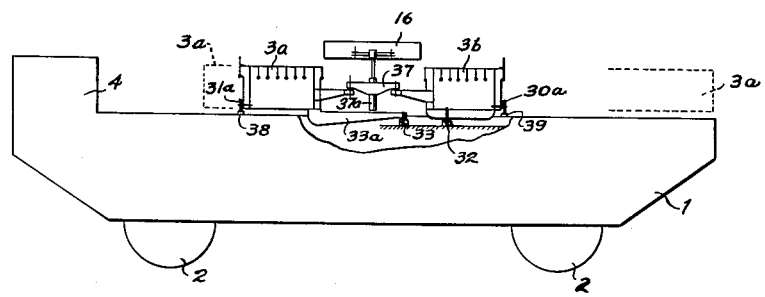
FIG. 7a is another side view with parts broken away of a unit in accordance with FIG. 7 showing the details of the mechanism for moving the bridge elements, with the elements expanded.
Figure 7B:
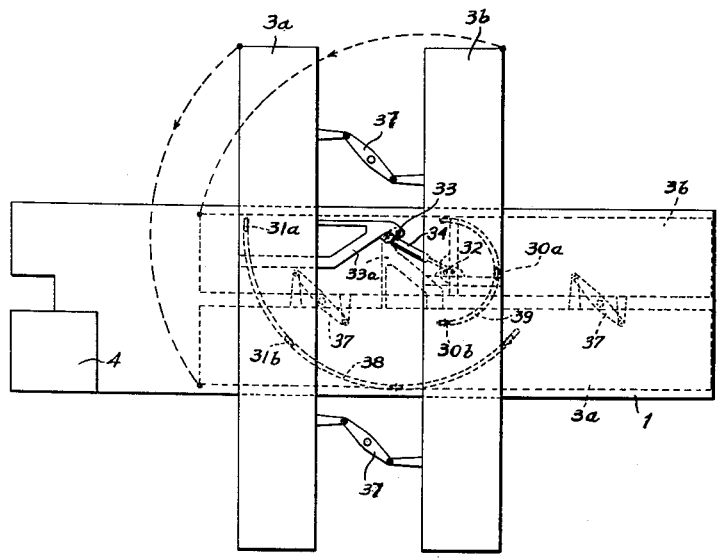
FIG. 7b is a plan view of the unit shown in FIG. 7a illustrating the mechanism with the elements in expanded and in closed position.

The floating body illustrated in FIG. 7 is provided with a bridge element which is mounted thereon and which is symmetrically divided along the longitudinal axis. The bridge members 3a, 3b which constitute the girders or beams may be displaced relative to one another as they are turned in a manner that within limits the track width of the bridge is automatically increased as illustrated in FIGS. 7a and 7b. The gap which is formed between the two bridge elements as a result of widening the bridge on the floating unit is closed by a center structural component 16, which during road transportation is located above the two bridge girder members 3a, 3b (See FIG. 9). The center structural component 16 constituting the mid-portion of the roadway is held in its upper positon during street transportation by mechanical, hydraulic or similar means and may upon expansion be moved downwardly into the gap which develops as the bridge elements 3a, 3b are expanded. In the embodiment illustrated in FIG. 7a the guide link mechanisms 37 are provided with hydraulic pistons 37a which serve to raise or lower the components 16 as required. In the lowered position the center component 16 rests atop the pistons 37a and is laterally supported by members 15 which extend inwardly of the bridge members 3a and 3b (FIG. 7). As the bridge elements are turned back into the initial position for road transportation, this center structural component 16 is first raised with the aid of the aforementioned auxiliary means; thereupon the turning back of the lateral bridge elements 3a, 3b can be undertaken, while the distance between these two parts is again automatically decreased.

The bridge girders or halves 3a and 3b which are connected by two spread links 37 are mounted to turn about two spaced apart pivots 32, 33 under the force exerted by hydraulic piston 34. Links 37 safeguard the parallel movement of the two elements 3a, 3b during movement into the expanded and the contracted positons. Guide rails 38 and 39 are provided for elements 3a and 3b, respectively, on which the elements are supported and guided by rollers 31a, 31b and 30a, 30b.

Figure 7C:
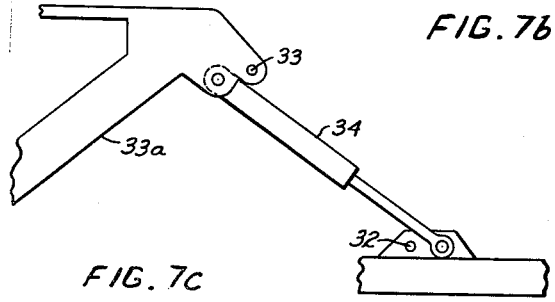
FIG. 7c is an enlarged view of the hydraulic piston in FIG. 7b.

The rails 38 and 39 are curved at different radii which provide for the expansion while the elements are turned through a 90° angle from transportation position to position of bridge operation. Also the position of pivots 32 and 33 relative to one another is a factor in the amount and manner of expansion. It should be noted that while girder 3b simply rotates about pivot 32, girder 3a is spaced from its pivot by the support arm 33a and performs a large arc, and since pivot 33 is spaced longitudinally of the structure from pivot 32 this distance is added to the length of member 33a when the girders are rotated 90°, thereby providing a wide space between girders 3a and 3b. Any desired type of motor means may be utilized for moving the bridge elements, for example, mechanical, hydraulic or electrical means. In the instant case a hydraulic cylinder 34 provides the power. This cylinder is linked to bridge girders 3a and 3b adjacent pivotal supports 33 and 32, respectively, as illustrated in FIG. 7c.

Girder element 3b is directly supported on its pivot 32, while element 3a is connected to its pivot 33 by means of an arm 33a. By means of this arrangement on positioning the girder elements not only expand as they are rotated but they are also moved forwardly longitudinally of the float so that the expanded girder elements are symmetrically centered on the float. For the transportation position of the elements the weight is shifted somewhat toward the rear axle of the float as it is desired to load the rear axle more than the front axle during road transportation.

FIG. 9 shows the front end of a floating unit in accordance with FIG. 7 with bridge girders 3a and 3b in transport position, floats inserted and brackets 24 in operative position. The brackets 24 which are retracted while the vehicle is travelling on land, as indicated in FIG. 1, serve in the operative position in accordance with FIG. 9 to suspend therefrom the floating bodies 8 which are blown up after being installed on the brackets 24.

The unfolding or expanding of the bridge is effected by particular structural means which provide for the lateral bridge elements 3a, 3b to move in circular arcs of different radii. By using circular arcs having different radii the automatic widening of the bridge during turning from the road transportation position to the water traffic position becomes automatic. Simultaneously, the bridge structure which is laterally disposed during road transport is symmetrically shifted toward the pontoon middle. The two girder elements 3a, 3b are connected to two joint levers so that as the bridge components are turned out these girders 3a, 3b can move only in parallel direction. The turning proper may be effected by means of spindles, hydraulically, or in any other way.

In order to increase the buoyancy of the rigid floating body and the stability, floating body 1 is provided with an additional floating body 8 along each side which may suitably be made of elastic material. The floating body 8 is subdivided by spacing walls 30 into individual chambers in order to increase the safety and, if need be, to enable the creation of oblique lists or balanicng of lists in a manner that individual chambers are filled as desired or by opening the intermediate valves. These lateral floating bodies can be filled with air or emptied by any suitable means known per se. For this purpose an air compressor installation or containers with compressed air may be connected to the driving or operating mechanism. Such compressor installation permits at the same time filling or emptying of the front and rear wheel chambers making it also possible in this manner to provide for or eliminate oblique positioning or listing of the floating body longitudinally of the bridge, which is achieved by forcing in or drawing out air by means of the compressor installation.

For the purpose of increasing the stability the two lateral float members 8 are braced by the brackets 24 provided at the two longitudinal sides of the floating body 1 (FIG. 9). The brackets are turned into recesses 25 along both sides of the floating body at a 90° angle for road transportation and are automatically latched. For the greater safety of the two lateral floating elements 8, the surfaces of the floating bodies are provided with carrier plates 26 which, in turn, are supported against the brackets (FIG. 8). During road transportation the carrier plates 26 are stored between the bridge elements and the control station upon the deck of the floating body 1.

For the purpose of increasing the buoyancy of the floating bridge within certain limits, elements of shorter length may be used. This makes necessary a larger number of rigid floating bodies, but the buoyancy of the entire bridge is made greater. For heavier loads it is therefore desirable to use shorter bridge elements and for lighter loads longer elements.

Figure 12:
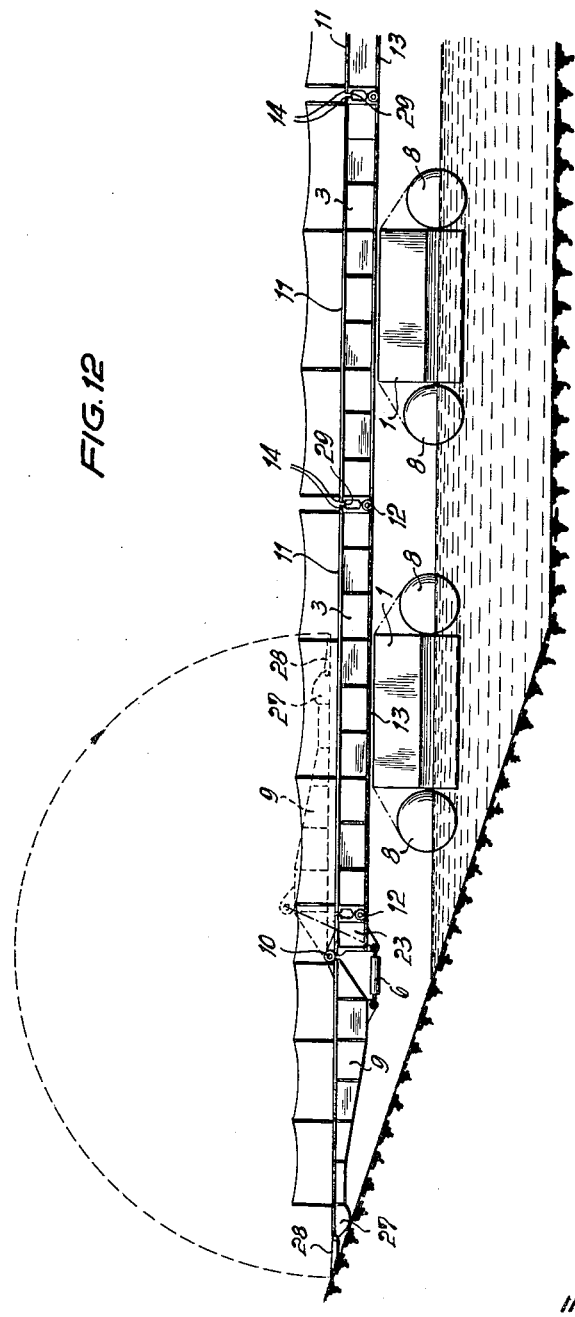
FIG. 12 shows a portion of a floating bridge or a ferry assembled from several floating bodies with bridge elements and having a loading ramp at one end.

FIG. 12 illustrates in side elevation a part of a floating bridge which is assembled from individual floating bodies 1 with additional bodies 8 and bridge elements 3.

The bottom girders portions 13 of the bridge elements are here connected by pivot joints 12. At the ends of the upper girder portions 11 pressure plates 14 are provided which face each other with or without tolerance as the bridge is loaded. The play gap 29 between plates 14 can be changed by inserting wedges in a manner to increase or decrease the load carrying capacity. It is possible in this manner without changing the bridge elements to increase the capacity of the bridge as merely the sinking depth of the floats 1 and 8 is increased or decreased.

A ramp 9 is connected to the bridge girders of the extreme left floating body (FIG. 12) with an articulated short bridge element 23 interconnected. The element 23 like the other bridge elements is connected at the lower girder portion to the adjoining bridge element and supports itself at the height of the upper girder portion against the other element by means of pressure plates 14.

The actual ramp 9 is connected at the upper girder portion to the bridge element 23 by means of a pivot joint 10. Between the lower girder portions of the ramp 9 and the bridge element 23 hydraulically or mechanically operated gear including a piston 6 or the like is connected by means of which the ramp 9 is moved pivotally into operative position and adjusted in such position. The ramp can be flapped over onto the bridge element during transport of the floating unit.

In order to make it possible for the ramp to be used and driven upon immediately without preparing the ground at the approach, the free end of the ramp is curved accordingly. That end is curved at the bottom so that the unevenness of the terrain in any position (high or low banks) of the ramp can be compensated. Furthermore, short approach or drive on flaps 28 are pivotally joined to the downwardly concave ramp end 27 which, in turn, adapt themselves to any unevenness of the terrain and make possible shock-free driving onto the ramp. In order to more clearly illustrate the relationship of the power plant and the components driven thereby, FIG. 14 shows in a simple schematic diagram the power plant 40, the transmission 41, the propeller windlass 31a, the compressor 42, the hydraulic pump 43, as well as the front and rear axles 2a and 2b.

Having now described the invention with reference to the embodiments thereof illustrated in the drawings, we do not wish to be limited thereto, but what we desire to protect by Letters Patent of the United States is set forth in the appended claims.

We claim:

1. A floating bridge comprising a plurality of amphibious self propelling floating units articulatedly connected to one another, each unit comprising a floating element and a bridge element pivotally supported on said floating element for movement into position of transport longitudinally of said floating element and into position of use transversely of said floating element, each said bridge element including a pair of girders connected to each other by spread link means, each girder having a pivot member including a pivot arm supporting the girder on said floating element, said pivot members being offset relative to each other and spaced longitudinally of said floating element, and motor means interposed between and connected to said pivot arms operative to move said girders in unison to be disposed closely to each other with a narrow space therebetween in position of transport and widely spaced from each other in position of use, each of said girders having upper and lower girder portions, each said lower girder portion having a pivot joint member, said pivot joint members at one end of said bridge element including means releasably connecting the pivot joint members at the girder ends of adjacent bridge elements to constitute horizontally disposed articulated joints and each of said girders having abutments endwise of the upper girder portion thereby providing a joint resisting downward tilting movement of an adjacent bridge element.

2. A floating bridge comprising a plurality of amphibious self propelling floating units articulatedly connected to one another, each unit comprising a floating element and a bridge element pivotally supported on said floating element for movement into position of transport longitudinally of said floating element and into position of use transversely of said floating element, each said bridge element including a pair of girders connected to each other by spread link means, each girder having a pivot member including a pivot arm supporting the girder on said floating element, said pivot members being offset relative to each other and spaced longitudinally of said floating element, and motor means interposed between and connected to said pivot arms operative to move said girders in unison to be disposed closely to each other with a narrow space therebetween in position of transport and widely spaced from each other in position of use, each of said girders having upper and lower girder portions, each said lower girder portion having a pivot joint member, said pivot joint members at one end of said bridge element including means releasably connecting the pivot joint members at the girder ends of adjacent bridge elements to constitute horizontally disposed articulated joints and each of said girders having abutments endwise of the upper girder portion, said pivot joint members at the lower end of each said girder projecting beyond said abutments thereby providing tolerance between the ends of adjacent elements and a joint resisting downward tilting movement of an adjacent bridge element.

3. A floating bridge comprising a plurality of amphibious self propelling floating units articulatedly connected to one another, each unit comprising a floating element and a bridge element pivotally supported on said floating element for movement into position of transport longitudinally of said floating element and into position of use transversely of said floating element, each said bridge element including a pair of girders disposed closely to each other with a narrow space therebetween in position of transport and widely spaced from each other in position of use, each of said girders having upper and lower girder portions, each said lower girder portion having a pivot joint member, said pivot joint members at one end of said bridge element including means releasably connecting the pivot joint members at the girder ends of adjacent bridge elements to constitute horizontally disposed articulated joints and each of said girders having abutments endwise of the upper girder portion thereby providing a joint resisting downward tilting movement of an adjacent bridge element, and a pair of spaced vertically extending pivot rods pivotally supporting said bridge element on said floating element, one said pivot rod extending between a location at the bottom of and intermediate the longitudinal sides of one said girder of said bridge element and said floating element and the other said pivot rod being mounted on said floating element and being offset with respect to and spaced from said one pivot rod in a direction longitudinally of the floating element, a support arm being connected to the other said girder and extending therefrom to said other pivot rod, a hydraulic piston or the like extending between said support arm and a connection proximate said one pivot rod, and spread link mechanisms extending between and connecting said girders.

4. A floating bridge comprising a plurality of amphibious self propelling floating units articulatedly connected to one another, each unit comprising a floating element and a bridge element pivotally supported on said floating element for movement into position of transport longitudinally thereof and into position of use transversely of said floating element, each said bridge element including a pair of girders having each upper and lower girder portions, each said lower girder portion having a pivot joint member, said pivot joint members at one end of said bridge element being connected to the pivot joint members at the girder ends of adjacent bridge elements to constitute articulated joints and said girders having abutments endwise of the upper girder portion thereby providing a joint adapted to oppose the upward movement of an adjacent element, said girders extending parallel to one another, each supported by a vertical pivot on said floating element, a separate arcuate rail mounted on said floating element supporting each of said girders for rotation into said transverse position of use, one of said rails having a smaller radius of curvature than the other rail, said rails being non-concentric, said vertical pivot for each of said pair of girders being located at the center of curvature of its respective arcuate rail, each pivot having a pivot arm, the one at the center of curvature of said rail of greater radius of curvature having a longer pivot arm, said girders being connected by a pair of pivoted spread links to maintain a parallel relationship, and motor means between said pivot arms to exert a force on said pivots to spread said girders in parallel relationship, thereby defining a space between said girders, and a center track supported on said floating element for vertical movement and having a width substantially equal to said space, said center track being received between said girders while said girders are rotated into expanded position transversely of said floating element.

5. A floating bridge unit in accordance with claim 4, including rollers secured to said girders and movable on said rails.

6. A floating bridge unit in accordance with claim 4, including fluid operated means comprising cylinders and pistons centrally of said link joints for lowering and raising said center track.

7. A floating bridge unit in accordance with claim 4, wherein said girders are provided with conformations endwise thereof including a projection at one girder end and a pocket at the other girder end whereby adjacent ends of elements may be initially interengaged during assembly of the bridge.

8. A floating bridge unit in accordance with claim 4, including a loading ramp, support means including a short section pivotally connected to the ends of the lower portions of said girders of one bridge element, a ramp pivot joint at the upper end of said short section remote from said bridge element, means pivotally connecting said ramp to said ramp pivot joint and power driven gear including hydraulic means or the like connected to the lower end of said section and the lower end of said ramp operative to move said ramp into bridge approaching position.

9. A floating bridge unit in accordance with claim 4, including a loading ramp, support means including a short section pivotally connected to the ends of the lower portions of said girders of one bridge element, a ramp pivot joint at the upper end of said short section remote from said bridge element, means pivotally connecting said ramp to said ramp pivot joint and power driven gear including hydraulic means or the like connected to the lower end of said section and the lower end of said ramp operative to move said ramp into bridge approaching position, the free end of said ramp being of concave conformation and having a drive-on flap connected endwise thereto.

10. A floating bridge unit in accordance with claim 6 including wheels retractably secured to each said floating element, each floating element having inwardly recessed housings for said wheels open at the bottom and having air tight walls.

11. A floating bridge unit in accordance with claim 10 including auxiliary floating members of elastic material extending longitudinally and laterally of said floating element and capable of being filled with air to add to the buoyancy of the bridge.

12. A floating bridge unit in accordance with claim 10 including brackets normally folded into the sides of said floating element for transportation and movable outwardly to rest on said auxiliary floating members for supporting said floating element thereon and carrier plates disposed intermediate said auxiliary floating members and said brackets.

13. A floating bridge unit in accordance with claim 11 including a compressor means connected to said motor means adapted to supply compressed fluid such as air to said housings and to said auxiliary floating members.

14. A floating bridge comprising a plurality of amphibious self propelling floating units articulatedly connected to one another, each unit comprising a floating element and a bridge element pivotally supported on said floating element for movement into position of transport longitudinally of said floating element and into position of use transversely of said floating element, each said bridge element including a pair of girders connected to each other by spread link means, each girder having a pivot member including a pivot arm supporting the girder on said floating element, said pivot members being offset relative to each other and spaced longitudinally of said floating element, and motor means interposed between and connected to said pivot arms operative to move said girders in unison to be disposed closely to each other with a narrow space therebetween in position of transport and widely spaced from each other in position of use, each of said girders having upper and lower girder portions, each said lower girder portion having a pivot joint member, said pivot joint members at one end of said bridge element including means releasably connecting the pivot joint members at the girder ends of adjacent bridge elements to constitute horizontally disposed articulated joints and each of said girders having abutments endwise of the upper girder portion, and means for propulsion on water and on land mounted on said floating element comprising a propeller and retractable wheels and a power plant to supply power to said propeller and to said wheels.

References Cited in the file of this patent

UNITED STATES PATENTS

| | | |
|---|---|---|
| 1,073,794 | Christensen | Sept. 23, 1913 |
| 1,447,893 | Roy | Mar. 6, 1923 |
| 1,941,348 | Hathorn | Dec. 26, 1933 |
| 2,339,098 | Nagin | Jan. 11, 1944 |
| 2,341,166 | Todd | Feb. 8, 1944 |
| 2,556,175 | Frost | June 11, 1951 |
| 2,562,431 | Maile | July 31, 1951 |
| 2,636,197 | Odot | Apr. 28, 1953 |
| 2,647,270 | Frost | Aug. 4, 1953 |

FOREIGN PATENTS

| | | |
|---|---|---|
| 760,159 | France | Dec. 6, 1933 |
| 1,112,888 | France | Nov. 23, 1955 |